Jan. 9, 1934.  C. SOULLIÉ  1,942,884

METHOD OF AND MEANS FOR RADIOSIGNALING

Filed May 28, 1931

INVENTOR
C. SOULLIÉ.
By Blair & Kilcoyne
ATTY'S.

Patented Jan. 9, 1934

1,942,884

UNITED STATES PATENT OFFICE 1,942,884

METHOD OF AND MEANS FOR RADIO-SIGNALING

Clément Soullié, Paris, France

Application May 28, 1931, Serial No. 540,716, and in France July 30, 1930

11 Claims. (Cl. 250—8)

The present invention relates to radio-communication systems and more particularly to a method of eliminating the effects of fading and like disturbances on transmitted messages.

The method of "delayed repetition" in the transmission of telegraphic signals has already been employed in radiotelegraphy for the elimination of additional signals, whether such signals are due to the action of parasites or interference when using direct transmission, or to the effect of fading when working on inverse transmission, sometimes referred to as counter-manipulation.

As the use of different codes or alphabets, direct manipulation, counter-manipulation, etc., in radiotelegraphy may cause confusion in the interpretation of the word "signals", it is to be understood first of all that the use of the word "signal" is intended hereinafter as meaning the action or the result produced by any electromagnetic vibration of the receiving aerial. This, also, is the interpretation which is to be applied in connection with the restoration of missing signals according to the present invention.

It is known, in particular, that in the method of delayed repetition, the transmission of any message, such as a letter, involves the emission of a number of "series" of signals composing the letter and that the signals of the successive series, which are spaced apart one from the other by a time T, constitute the confirmations or repetitions of the letter in question.

If additional signals such as parasites have to be eliminated, the successive messages are so combined that only those signals which are common to all of the "series" actuate the final receiver, translator, printer, recorder, etc.

The object of the present invention is the exact reverse of the above, since it aims at restoring missing signals, however the loss may arise, by transmitting a message a plurality of times, and at a receiver, registering or recording the received signals of the first transmission, registering or recording those received signals of the second transmission not already registered or recorded from the first transmission and continuing the process of registering or recording those received signals of a subsequent transmission not already registered or recorded from all the next preceding transmissions a number of times corresponding to the number of transmissions, and translating the final message thereby obtained.

It will be seen that the present invention as hereinafter more fully described is quite distinct from those methods of eliminating fading previously proposed, based on a repeated transmission of the message. According to these proposed methods, a separate intermediate record is made at the receiving station of the series of signals received at each transmission and these intermediate records simultaneously used and compared to produce a single record of the transmitted message wherein the effects of fading, insofar as they have not affected all the transmissions, are eliminated. It will be seen, on the contrary, that the method of the present invention has for a basis the gradual building up of the complete message with each successive transmission. To this end, when the first series has been registered, missing signals are added to the registered signals successively as received in any subsequent transmission, until with the last transmission an automatic registration is obtained of signals forming a single message containing all those signals received from the different transmissions which are different from one another.

It will also be seen that the method according to the invention renders it unnecessary to modify the codes or alphabets normally employed in the different telegraphic systems, or to add thereto the principle of "counter-manipulation", or of multiple transmissions (simultaneous or delayed transmission of the same text by several transmitting stations working on different wavelengths) or, generally, to associate it with any other method in order to attain the object hereinbefore described.

The invention will be better understood from the following description taken in connection with the accompanying drawing which shows, by way of example, two practical embodiments thereof.

In the drawing—

*Perforated-strip apparatus*

The application of the invention to telegraphic apparatus employing a perforated strip as the connecting element between the reception of the signals and the translation or typographical printing thereof can be effected as follows:—

The successive series of signals received in the course of the transmission of a letter act in turn on the same receiving strip so as to effect "complementary perforations" along a line extending across the strip corresponding to the letter to be received or, generally, at the place on the strip allotted to the normal perforation of the letter in question.

Figure 1:
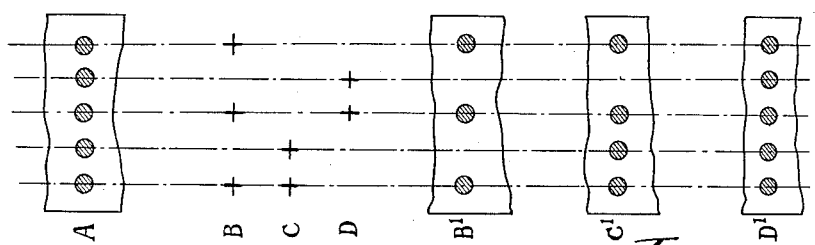
Fig. 1 shows a section of a receiving strip and its successive transformation.

For example, an apparatus employing the "5 element" code which ought to receive a perforation as at A in Figure 1 and which receives a first series of signals, distorted for any reason, as at B, then a second series as at C and yet a third series, for example, as at D, would have its perforated receiving strip successively transformed as shown in Fig. 1 at B', C', D'.

This result can easily be obtained in simplex apparatus (Siemens etc.) by arranging for the same place on the receiving strip to be under the same perforating punches or under corresponding punches at the moment when the corresponding signals comprising the successive series of emissions of the letter in question are received.

In multiple apparatus (Baudot etc.), the arrangement will be made so that the place on the strip allotted to the perforation is situated under the punches of the successive perforators as the currents corresponding to the 1st-2nd-$n$th series of signals are received. The Siemens, Baudot, and similar types of apparatus hereinbefore mentioned, together with their methods of operation, are well-known to those skilled in the art and are fully disclosed in e. g. Printing Telegraph Systems and Mechanisms, by H. H. Harrison, London, 1923, and Les Systèmes de Télégraphie ou de Téléphonie, by Baillière, Paris, 1922. Consequently, it is not thought necessary here to discuss such types of apparatus in detail as they can be found in the publications cited and, in any case, they, per se, form no part of the present invention. Accordingly, I have merely indicated the manner in which such apparatus is to be modified so as to be workable for obtaining the result I claim.

*Apparatus employing delayed-action contactors*

The application of the invention to this type of apparatus can be effected simply, by so arranging the connections of the slow-acting relay with the telegraphic receiving apparatus that the release of any electromagnet automatically transfers its effect to the final receiver. Here again, and for the reasons already mentioned above, it is not thought necessary to give a detailed description and illustration of the construction and mode of operation of this known type of apparatus, but in order to illustrate my invention, I will refer by way of example to the Baudot apparatus disclosed in Patent No. 1,677,062 to Verdan and Loiseau and I will indicate by reference to the following description and the schematic arrangement in Fig. 2 hereof, the manner in which such apparatus as disclosed in the patent cited, is to be modified for operation in accordance with the present invention.

In Patent No. 1,677,062 to Verdan and Loiseau there is disclosed a method of signaling according to which a message is transmitted a plurality of times in sequence according to some predetermined rule and only those signals which obey the rule are selected from the received signals and their repetitions. Figures 5 and 6 of that patent respectively illustrate suitable Baudot receiving and transmitting apparatus for operating according to this method.

In my present invention, I utilize the method of delayed repeated transmission adopted by Verdan and Loiseau and I therefore employ transmitting apparatus such as is described with reference to Fig. 6 of their patent. However, the novelty of my invention consists in the manner in which reception and printing of the message is effected and accordingly I make such alterations and modifications to Baudot apparatus such as is described with reference to Fig. 5 of the patent above cited, as will now be described.

Referring to the accompanying Fig. 2, the schematic arrangement illustrated therein is intended to show the manner in which the layout of the Baudot apparatus illustrated in Fig. 5 of Patent No. 1,677,062 is to be modified in order to obtain my desired result and it is believed that no further explanation, other than that contained in the following, is necessary for such modifications as are necessary, to be understood by those skilled in the art.

Three sectors $SR_1$, $SR_2$, $SR_3$ of the modified Baudot distributor are arranged so that the divided ring $C_1$ is connected with the continuous ring $C_2$ by the brushes B and similarly the continuous ring $C_3$ is connected with the divided ring $C_4$ by the brushes $B_1$.

Figure 2:
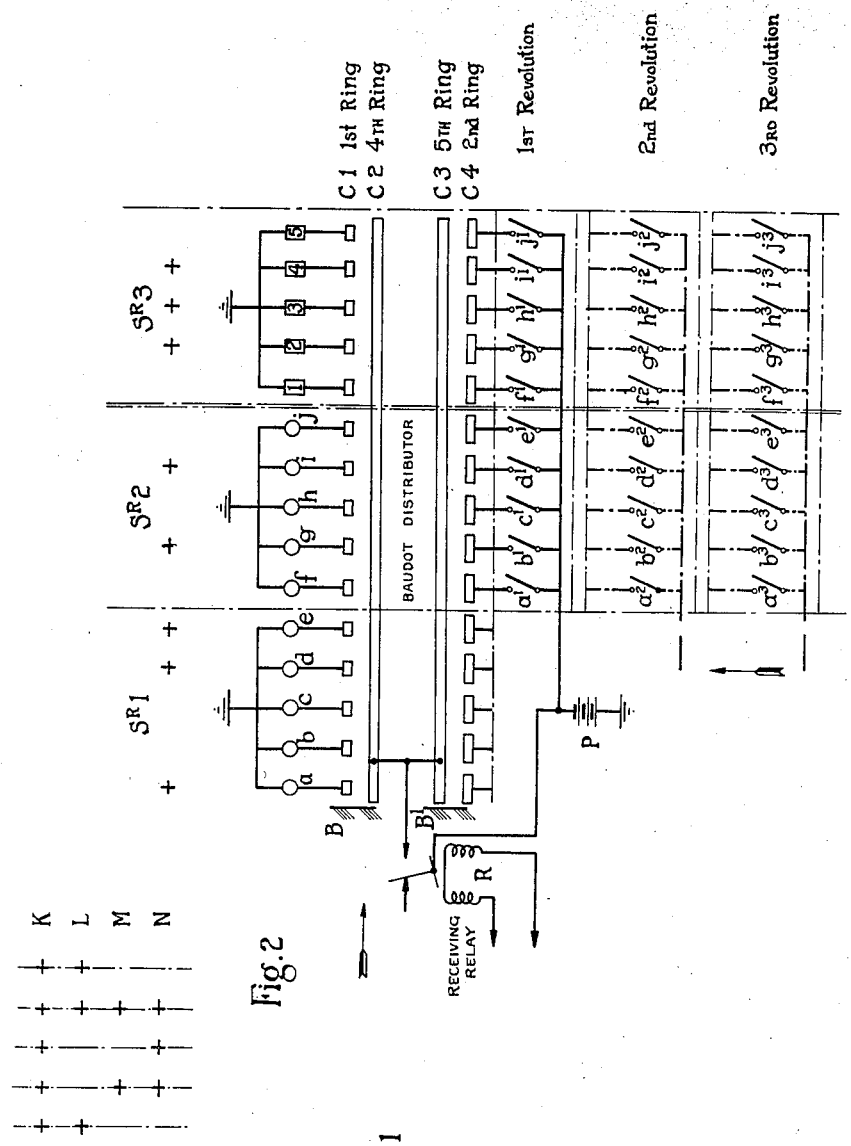
Fig. 2 shows a circuit arrangement suitable for attaining the desired results on an apparatus of the Baudot type.

For the sake of clearness, these rings are shown "developed" in Fig. 2.

The insulated contacts of the first sector $SR_1$ of $C_1$ are connected to 5 electromagnets $a$, $b$, $c$, $d$, $e$ of a delayed-action contactor which is provided for closing the contacts of one of the groups $a_1$—$e_1$, $a_2$—$e_2$, $a_3$—$e_3$ of the sector $SR_2$ after a time lag T equal to that which separates the successive "series" of signals forming the same letter.

In the same way, the electromagnets $f$, $g$, $h$, $i$, $j$, control the contact groups $f_1$—$j_1$, $f_2$—$j_2$, $f_3$—$j_3$ of the sector $SR_3$ with the same time lag.

Finally, the translating electromagnets 1, 2, 3, 4, 5, are connected to $C_1$ in the sector $SR_3$.

A battery P is provided for supplying current to the sets of electromagnets, $a$—$e$, $f$—$j$, 1—5, connected to the ring $C_1$, which battery operates through the contact of the receiving relay R and may also operate through such contacts of the groups $a_1$—$e_1$, etc., as may have been closed on reception of a previous transmission.

The time lag T will be governed by the number of groups of commutators with which the delayed-action contactors are provided. The substitution of one group for another is effected at each revolution of the distributor and if the number of groups is $n$ the time lag T will therefore be given by $n$ revolutions. For the purpose of explanation, I have illustrated the delayed-action contactors as being provided with three groups of commutators $a_1$—$j_1$, $a_2$—$j_2$, $a_3$—$j_3$.

In operation, when the distributor brushes pass over the insulated contacts of the first ring $C_1$, the five electromagnets $a$—$e$, comprising the first set, are energized in accordance with the Baudot combination which is received as successive impulses in the receiving relay R, so that such combination is distributed to these five electromagnets. In the example illustrated, the letter to be received gives a combination of signals according to K (Fig. 2) and the series L, M, N of signals illustrated by way of example are those received from the first, second and third transmissions respectively. Therefore, reception of the first transmission will result in the combination L being distributed to the first set $a$—$e$ and only the electromagnets $a$, $d$, $e$ being energized, which then operate to close contacts belonging to that group of the groups $a_1$—$e_1$, $a_2$—$e_2$ and $a_3$—$e_3$ which is at this moment opposite the armatures of these electromagnets. For example, if the group of contacts $a_3$—$e_3$ is in this position at the moment of energizing the electromagnets $a$, $d$, $e$, this group will store the combination L so as to be able to transmit it after an interval of two revolutions to the contacts of the second ring $C_4$, when the brushes pass in front of the sector $SR_2$. At the moment when this occurs, the combination L is then transferred to the electromagnets $f$, $i$, $j$ of the second set of five electromagnets $f$—$j$.

However, it will be observed that Baudot combinations may arrive at the set of electromagnets $f$—$j$ by two parallel paths, one from the group $a_3$—$e_3$ of delayed contactors storing the combination L, and the other from the distributor which directly distributes the combination M received at the relay R due to the first repetition (second transmission) of the letter. The synchronization of the Baudot apparatus allows these two signal combinations L and M of the same letter and arriving by different paths to reach the set of electromagnets $f$—$j$ at the same instant, so that the combination distributed to this set of electromagnets is the nett total of the two separate combinations L and M. It is clear, therefore, that if a current element has been missing for some reason from the combination L distributed to the first set of electromagnets $a$—$e$, it may be restored by the repetition M of the combination distributed directly from the relay R to the second set of electromagnets $f$—$j$ at the same instant as this set receives the combination L stored from the distribution to the first set $a$—$e$. In the example illustrated, the electromagnets $f$, $i$, $j$ of the second set will be energized by reason of the storing of the combination L received from the first transmission. At the same instant as this combination is transferred to the second set of electromagnets $f$—$j$, the combination M is distributed from the receiving relay R to this set of electromagnets and will therefore energize the electromagnets $g$ and $i$, the net result being therefore that of the second set, $f$, $g$, $i$, $j$, are energized.

The process above described with reference to the sector $SR_2$ is repeated with the sector $SR_3$, so that the combination distributed to the set of translating electromagnets 1—5 will be the net total of (1) the combination (L+M) transferred from the set of electromagnets $f$—$j$ and stored up in one of the groups of contacts $f_1$—$j_1$, $f_2$—$j_2$, $f_3$—$j_3$, and (2) the combination N distributed directly by the distributor from the receiving relay R and due to the second repetition (third transmission) of the letter. In the example illustrated, the third current element was missing from both the received combinations L and M of the first and second transmissions respectively, but this element was restored by the combination N received from the third transmission. This, as is well known, is in accordance with practical experience wherein it is found that the probability of interference attacking several transmissions of the same message in exactly the same place in each is extremely remote.

After three transmissions, therefore, (the first transmission and the two repetitions), the letter combination K according to the example given will be correctly received at the final translating electromagnets 1—5 by a combination of the combinations L, M and N, so that the set of translating electromagnets is energized correctly for printing the letter transmitted.

I claim:—

1. Method of eliminating the effects of fading and like disturbances from radiotelegraphic messages, which comprises transmitting the message a plurality of times, receiving the repeated transmissions of the message in a receiving device, registering the signals received from the first transmission of the message, successively registering as received and adding to the said first signals, the signals received from each subsequent transmission of the message which have not already been registered, and making a record from all the signals so registered.

2. Method of eliminating the effects of fading and like disturbances from radiotelegraphic messages, which comprises transmitting the message a plurality of times, at predetermined intervals, receiving the repeated transmissions of the message in a receiving device, registering the signals received from the first transmission of the message, successively combining, as received, the signals from each subsequent transmission with the signals already registered from all the next preceding transmissions, and finally applying the signals of the last message received together with the signals already registered to translating means.

3. Method of eliminating the effects of fading and like disturbances from radiotelegraphic messages, which comprises transmitting the message a number of times, at predetermined intervals, receiving the repeated transmissions of the message in a common receiving device, directly registering all the signals received from the first transmission of the message on a single record carrier, and building up the message thereon, at each transmission, by directly registering in succession on the said record carrier signals from each of the subsequently received transmissions not already registered thereon from all next preceding transmissions.

4. Apparatus for registering radiotelegraphic signals received as successive transmissions of the same message, comprising in combination a receiving device, means for registering the signals received from the first transmission, means for registering and adding to the said first signals, successively as received, the signals received from each subsequent transmission which have not previously been registered from all the next preceding transmissions, and means for adding thereto and registering the signals from the last transmission in such a manner that with the said last registration only all those signals occurring in the received messages which are different from one another have been registered.

5. Apparatus for recording radiotelegraphic signals received as successive transmissions of the same message, comprising in combination a receiving device, means for applying the received signals to registering means, registering means including means for registering the signals received from the first transmission of the message and means for successively adding to the said signals of the first transmission, as received, those signals from each subsequent transmission not previously registered from all the next preceding transmissions, and recording means operated by said registering means for recording all the signals so registered.

6. Apparatus for recording radiotelegraphic signals received as successive transmissions of the same message, comprising in combination a receiving device, registering means including a plurality of registering devices, means operated by the said receiving device for applying the received signals to said registering means, including means for applying the received signals constituting one transmission of the said message to a first registering device, means for applying the signals received from a repetition of the message, together with the signals from the said first registering device, to a second registering device, means for adding to the signals previously received, in successive registering devices and successively as received, signals from each of the subsequently received messages, and means for applying the signals from the last message received, together with the signals from the final registering device, to translating means.

7. Apparatus for recording radiotelegraphic signals received as successive transmissions of the same message, comprising, in combination, a receiving device, means operated thereby for applying the received signals to a plurality of registering devices corresponding in number to the repeated transmissions of the message, recording means for recording the received messages on a common record carrier successively, as received, to produce a record comprising all signals occurring in the combined messages which are different from one another, and means, operated by said registering devices, for applying received signals to said recording means.

8. Apparatus for recording radiotelegraphic signals received as successive transmissions of the same message, comprising, in combination, recording means, means controlled by received signals for energizing said recording means, alternative means for energizing said recording means in accordance with previously received signals, and means operated by said previously received signals for presetting said alternative means.

9. Apparatus for recording radiotelegraphic signals received as successive transmissions of the same message, comprising, in combination, recording means, a commutator device comprising segments connected to said recording means, means for connecting said commutator segments to a source of energy in accordance with signals received, and means, preset in accordance with previously received signals and connected to corresponding segments of a second commutator device, for connecting said recording means to said source of energy.

10. Apparatus for recording radiotelegraphic signals received as successive transmissions of the same message, comprising, in combination, recording means, a commutator device comprising segments connected to said recording means, means for connecting said commutator segments to a source of energy in accordance with signals received, means connected to corresponding segments of a second commutator device for connecting said recording means to said source of energy, and means connected to segments of said first commutator device for presetting said last-named means in accordance with previously received signals.

11. Apparatus for recording radiotelegraphic signals received as successive transmissions of the same message, comprising, in combination, a commutator ring divided into segments, a plurality of recording devices connected to segments of said commutator ring, a plurality of relays connected to other segments of said commutator ring, a second commutator ring comprising segments displaced with regard to said first commutator segments, means for connecting the segments of said second commutator ring to the segments of said first commutator ring, contacts connected to said displaced segments of said second commutator ring and operated by said relays in accordance with received signals, and means for connecting said recording devices to a source of energy in accordance with subsequently received signals, to produce a simultaneous recording by said recording devices of all of said signals received.

CLÈMENT SOULLIÉ.